July 15, 1958
V. MATERESE
2,843,729
ILLUMINATING BAGGAGE RACK
Filed March 30, 1955
2 Sheets-Sheet 1
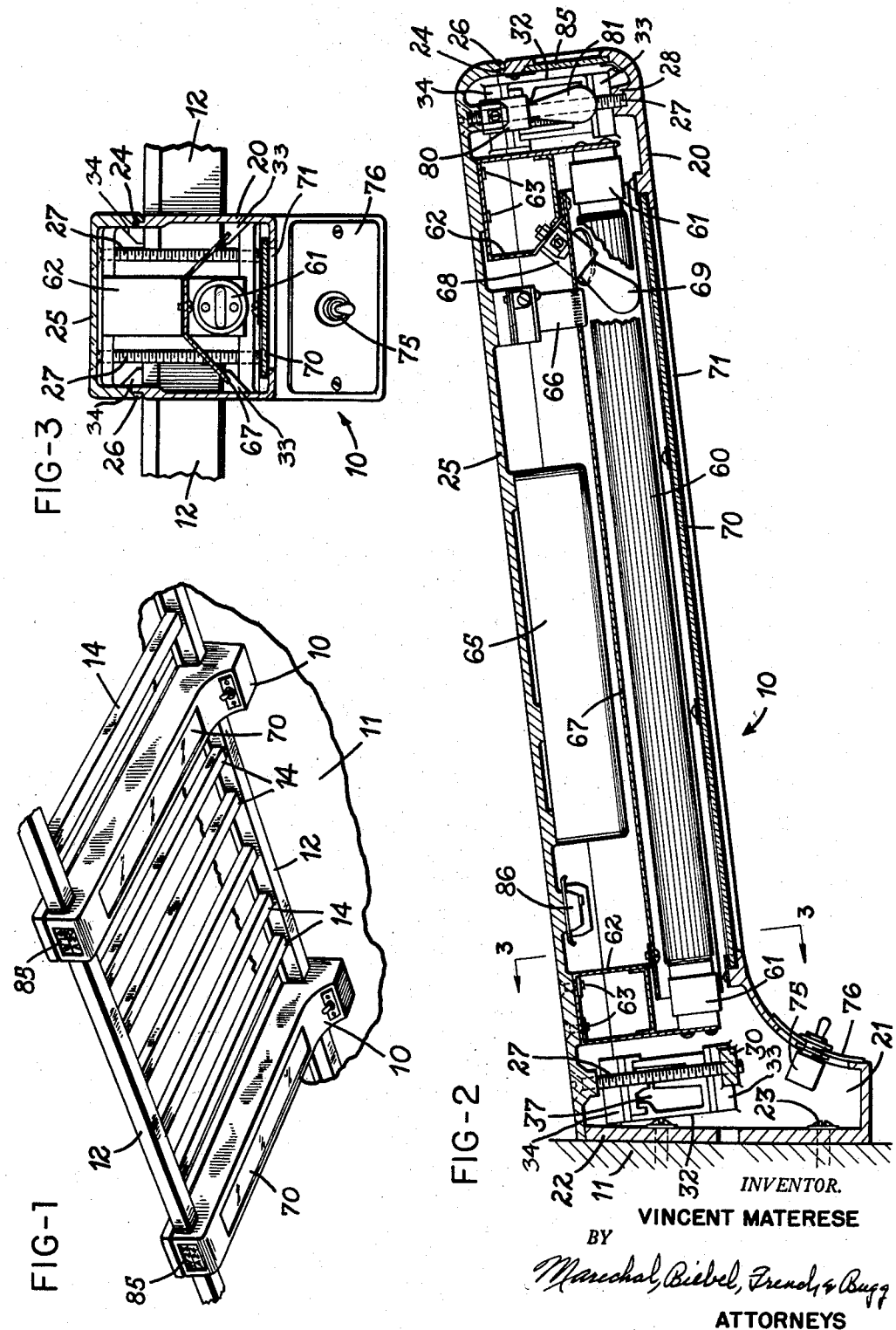
INVENTOR.
VINCENT MATERESE
BY
*Marechal, Biebel, French & Bugg*
ATTORNEYS

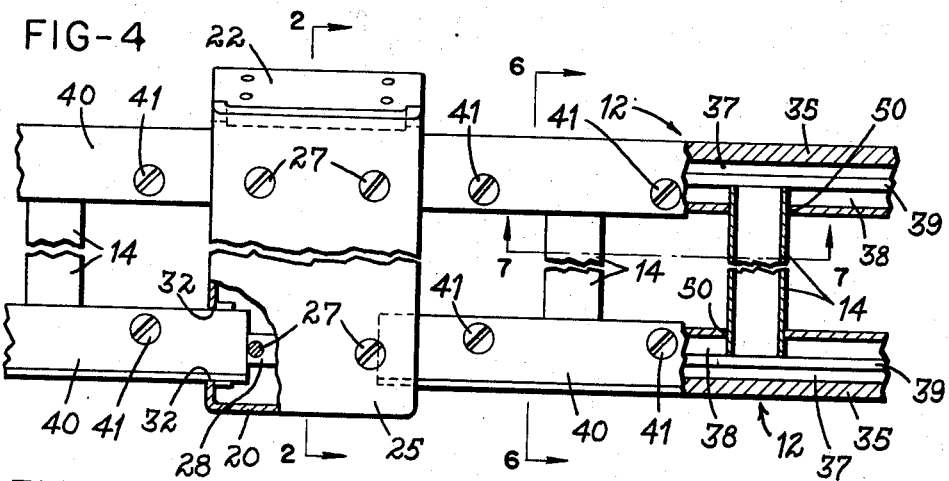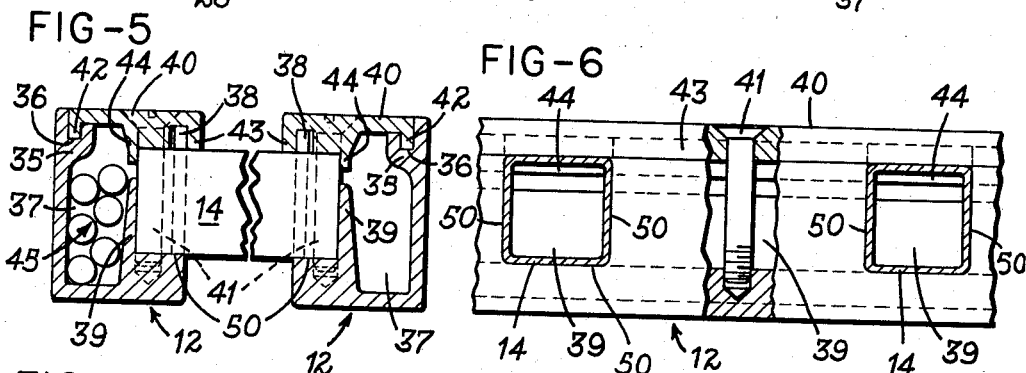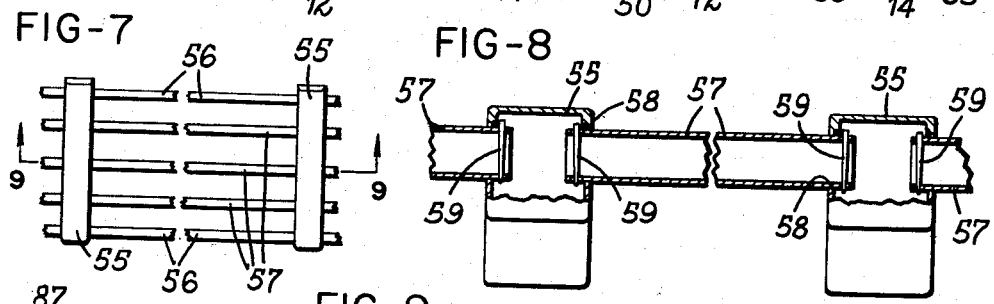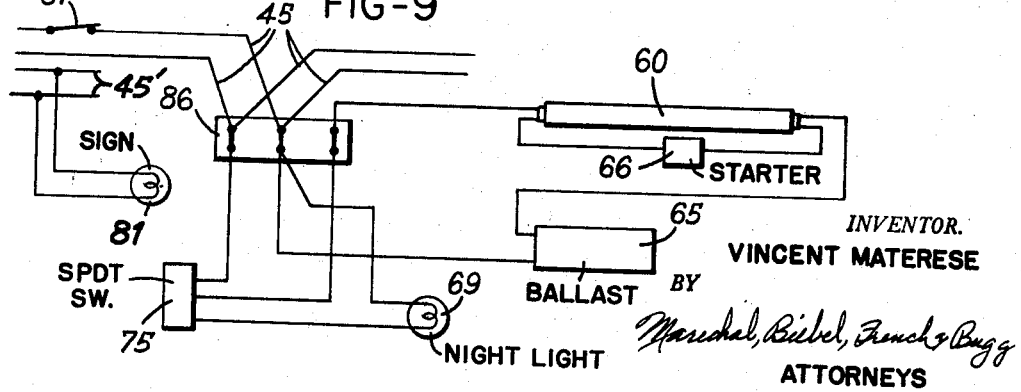

United States Patent Office 2,843,729
Patented July 15, 1958

2,843,729

ILLUMINATING BAGGAGE RACK

Vincent Materese, Dayton, Ohio, assignor to Mink-Dayton, Inc., Dayton, Ohio, a corporation of Ohio Application March 30, 1955, Serial No. 497,890

10 Claims. (Cl. 240—7.35)

This invention relates to a baggage rack for a railroad car or similar vehicle, particularly such a rack wherein the lighting fixtures for the vehicle are incorporated as part of the rack structure.

According to the present invention, an overhead baggage or parcel rack is provided to be fixed to the walls of the vehicle, and the main cantilever brackets of the rack incorporate suitable lighting equipment for the individual seats in the vehicle. These brackets are so arranged that one is placed above each successive seat in the vehicle, and the lighting equipment therein may be controlled by the occupants of the individual seats. Since there is one bracket for each such seat, it is also possible to have the identification plate for each individual seat carried by the bracket associated with each seat.

The rack structure itself, in accordance with this invention, provides a conduit or passageway connecting each of the successive brackets and the electrical equipment therein to provide a simple and economical means of wiring this equipment. The installation and repair of the baggage rack and the associated lighting equipment is therefore greatly simplified and much more economical. Thus instead of having to extend the wiring for successive lighting brackets through the walls of the vehicle, an expensive and tedious process, the invention provides for locating the wiring externally of the wall while at the same time retaining it in concealed and protected position.

In addition, the present invention provides a baggage rack which may be quickly and easily assembled, and in which the length of the rack sections connecting successive brackets may be easily altered to provide the required spacing between successive brackets in accordance with the seat spacing of the vehicle. This results in economy in both manufacturing and assembling, since the spacing requirements for different types of vehicles, i. e., railroad cars, buses, or the like, will vary with the seating arrangement. This spacing even varies among the different railroads, which will use different spacings between successive seats in accordance with their own specifications, and consequently alter the spacing of the lighting and support brackets of the baggage rack and the length of the rack between successive brackets.

The present invention provides a rack which may be constructed and assembled in variable lengths with considerable ease, it being only necessary to cut off the required length of connecting channel members for extending between successive brackets, and then providing whatever number of cross members may be needed to complete the rack. Since these channel members are readily formed of aluminum or similar light metal extrusions which may be furnished in any length desired, the assembled rack is quite rigid, capable of supporting considerable weight in parcels or luggage, and yet is itself relatively light in weight, thereby lessening the strain on the mounting brackets.

It is therefore a primary object of this invention to provide an illuminating baggage rack wherein certain of the rack members are arranged to define enclosed passageways between the several successive supporting brackets of the rack, and the wiring for the lighting equipment is housed in these passageways.

Another object of the invention is to provide such a rack which is relatively simple and inexpensive to manufacture and which may be easily assembled into rack sections of variable length.

Other objects and advantages of the invention will be apparent from the following description, the accompanying drawings and the appended claims.

In the drawings—

Fig. 1 is a perspective view of a portion of a baggage rack provided by the present invention;

Fig. 2 is a vertical section through one of the cantilever brackets of the rack, as taken along line 2—2 on Fig. 4;

Fig. 3 is a partial section along line 3—3 on Fig. 2;

Fig. 4 is a plan view of a baggage rack in accordance with the invention, with the cross members and bracket of the rack broken and foreshortened;

Fig. 5 is a section along line 5—5 on Fig. 4;

Fig. 6 is a section along line 6—6 on Fig. 4;

Fig. 7 is a plan view on a reduced scale of a modified type of baggage rack provided by the invention;

Fig. 8 is a section along line 8—8 on Fig. 7; and

Fig. 9 is a schematic wiring diagram of the lighting equipment provided in each of the brackets as seen in Fig. 2.

Referring to the drawings, which illustrate preferred embodiments of the present invention, Fig. 1 shows a portion of a baggage rack constructed in accordance with the invention wherein two identical brackets 10 are fixed in cantilevered fashion, that is, at one end only, to a wall of a vehicle, a segment of which is shown at 11. The adjacent ends of successive brackets 10 are joined by channel members 12 to form a substantially rectangular framework within which a number of cross members 14 are supported transversely of the rack between channel members 12.

There may be any number of brackets 10 fixed to the vehicle wall, depending upon the length of rack desired. Each of these brackets contains the lighting equipment and the identifying plate for a seat in the vehicle. Thus, the brackets are spaced from each other to locate successive brackets over successive seats and thereby to align the lighting equipment properly.

Referring to Figs. 2 and 3, details of one of the brackets are shown, it being understood that all the brackets are of identical construction to the one shown here. The bracket includes a main hollow body 20 having an enlarged inner end 21 and an end wall 22 through which suitable mounting bolts 23 are passed to secure the bracket to wall 11. A ridge 24 projects from the upper edge of body 20 about its entire periphery, and a cover 25, having a flange 26 which fits over ridge 24, is provided to complete the bracket enclosure.

Cover 25 is fastened by bolts 27, a pair of which are received within a boss 28 at the outer end of the bracket, and the other pair of which are received in a web 30 extending across inner end 21 of body 20. In the opposite sides of body 20, directly aligned with boss 28 and web 30, there are provided open top slots 32 into which the ends of channel members 12 are set, and these members extend into body 20 and butt against bolts 27. Thus these bolts serve as stops or abutments for the channel members to prevent shifting of these members longitudinally of the rack. The lower edge or flange 26 on cover 25 serves to clamp the channel members in slots 32 when the cover is in place. Furthermore, lower platforms 33 extend from the interior surface of the brackets at the lower edge of slots 32, to support the lower ends of the channel members, and similar platforms 34 extend from the interior surface of lid 25 to engage the upper surface of the channel member ends, serving to clamp the channel members against vertical movement when the cover is in place.

Referring to Fig. 4, the channel members 12 are shown in detail as each including a main body having an enlarged side 35 which extends the full length of the channel and is grooved along its upper edge at 36. The interior of the channel is divided into major and minor passageways 37 and 38 by a longitudinal partition 39 projecting from the bottom of the channel offset from the center thereof to divide the cross section of the channel into larger and smaller areas. A cover 40 is secured over the open end of channel body 35 by suitable bolts 41 which are offset from the center of the channel members to pass through the minor passageway 38. The cover 40 includes a smaller lip 42, which is received within groove 36, and a larger lip 43 which overlaps the opposite side of channel body 12. A short web 44 projects from cover 40 along substantially its entire length, and is adapted to be aligned with partition 39 to provide further separation between the major and minor passageways 37 and 38.

Channel body 12 and its cover 40 may be formed of any desired material which may be worked into the proper form, that is, the irregular cross section such as seen in Fig. 5. However, it has been found as a practical matter that these members may be readily formed as extrusions of aluminum or other relatively light weight metal which may be extruded into accurate but irregular shapes. Thus a length of channel body and its cover may be provided having a uniform irregular cross section and of any desired length. It is thereby possible to vary the dimensions of a rack section connecting successive brackets 10 in accordance with the requirements prescribed by the location of the seats in the vehicle.

When channel members 12 are placed in slots 32 and covers 40 and 25 bolted in place, the channel members, and particularly the major passage therethrough, provide fully enclosed passageways between successive brackets 10. These passageways are utilized as conduits for electrical wiring 45 (Fig. 5) to supply electricity to the lights and switches in brackets 10. Thus, in accordance with the invention the wiring 45 is substantially completely enclosed between the walls of channel member 12, partition 39, cover 40 and the web 44 projecting from the cover. The location of cover bolts 41 on the other side of partition 39, that is, within the minor passageway 38, prevents any contact between the threaded portions of these bolts and the wiring 45. Consequently, the possibility that vibration of the vehicle might cause the wiring to rub against the threaded portions of bolts 41 and wear the insulation off the wires, with the result that an eventual short circuit could be caused, is completely eliminated.

The rack is completed by a number of cross members 14, which are preferably tubular aluminum extrusions of generally square cross section, as in Fig. 6. Suitable open top slots 50 are formed in one side of channel members 12 at regular spaced intervals to receive the ends of cross members 14. These slots are in the wall of the channel body below cover lip 43, so that in assembly the cross members but against partition 39 and are held against movement transversely of the rack, and the channel covers 40 act to clamp the cross members in place.

A modified construction is shown in Figs. 7 and 8, wherein brackets 55 are connected by channel members 56, identical to the channel members 12, and wherein cross members 57 are provided of the same tubular material as members 14, but extend parallel to channels 56 between successive brackets 55. The ends of cross member 57 extend slightly within brackets 55, through suitable slots 58, and tapered pins 59 pass through the ends of the cross members within the bracket housings to hold the cross members 57 against longitudinal shifting. In all other respects the modified rack shown in Figs. 7 and 8 is identical to that shown in Figs. 1–6.

Each bracket 10 and 55 contains appropriate lighting equipment, as previously described. As seen in Fig. 2, a fluorescent light 60 is mounted in sockets 61 carried by suitable framework 62 which is fastened to cover 25 in any desired manner, for example, by screws 63. A ballast 65 and a starter 66 are similarly mounted on cover 25, and a reflector 67 is supported between opposite ends of the framework 62. Also carried by one end of the framework is a small electrical socket 68 holding a small bulb 69 for use as a night light or for similar purposes where the full bright light of the fluorescent tube 60 is not needed. A translucent panel 70 is received within a rectangular aperture 71 in the bottom of bracket body 20, and a single pole double throw switch 75 is supported on a plate 76 at the inner end 21 of the bracket body.

At the outer end of the bracket, and fastened to the cover 25, is another small electrical socket 80 carrying a bulb 81 which is centered behind an identifying plate 85 of translucent material, upon which is marked suitable identifying insignia for the particular seat with which the bracket is associated. For example, in Fig. 1, the plate 85 is seen as marked with "W–19, A–20," signifying that the associated seat below the bracket is divided into two chairs, the one adjacent the window being number 19, and the one on the aisle being number 20. All the above identified electrical equipment in each bracket is wired to a terminal strip 86 which is also carried on cover 25, and to this strip is connected the electrical wiring 45 passing through the major portion of channel 12 at the inner end of the bracket. Thus by merely disconnecting the wiring in the channel member from a terminal strip, the lighting equipment in an entire bracket may be disconnected from its appropriate circuit.

Referring to Fig. 9, the schematic wiring diagram for the lighting equipment in each bracket 10 is seen to include the terminal strip 86 connected to the wiring 45, within which a suitable switch 87, generally located in the electrical locker at one end of the vehicle, is placed to control the entire supply of electricity. The sign light 81 is connected directly across incoming wires 45', and is in a separate circuit which is controlled by a separate switch (not shown) in the electrical locker, thus providing for separate energization of the seat marker lights only at such times as they are needed, for example, while in a station when there is a change in passengers. The S. P. D. T. switch 75 in its central position disconnects both the fluorescent tube 60 and night light 69. In one closed position of switch 75 two opposed prongs of fluorescent tube 60, the ballast 65, and the associated terminals of switch 75 are connected in series with each other to the wires 45. Starter 66 is wired between the other terminals of tube 60 in the usual manner. Thus, in this position of switch 75 the main light, that is, the fluorescent tube 60, is illuminated. In the other closed position of switch 75 the night light 69 is energized and the fluorescent tube is deenergized, thereby providing a small amount of illumination as desired.

From the foregoing description it will be clear that all wiring 45 is carried between successive brackets 10 within the fully enclosed passageway through channels 12. This wiring is accessible at any time merely by removing the covers 40 as desired, and of course this construction provides for relatively simple installation since it is only necessary to lay the wires within the channel members before covers 40 are put in place. In addition, both the channel members 12 and cross members 14 are securely held in position by reason of their abutting engagement with the bolts 27 and partitions 39, respectively, and by the clamping action of bracket covers 25 and channel covers 40. The length of rack section between successive brackets 10 can easily be altered by merely providing the necessary length of channel member 12 and the appropriate number of cross members 14.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device of the character described including a plurality of hollow cantilever brackets each having mounting means at one end thereof and each enclosing electrical lighting equipment, said brackets being adapted for mounting in substantially horizontal alignment, channel members connecting adjacent ends of successive said brackets to provide substantially rectangular frameworks, slots in the sides of said brackets for receiving the ends of said channel members, covers for said brackets, fastening means for said bracket covers including bolts extending across said slots within said brackets and providing abutments for said ends of said channel members, channel covers fastened over the open sides of said channel members to provide fully enclosed passageways for electrical wiring between successive said brackets, and cross members supported within said frameworks and spaced to provide for carrying articles thereon.

2. A device of the character described including a plurality of hollow cantilever brackets each having mounting means at one end thereof and each enclosing electrical lighting equipment, said brackets being adapted for mounting in substantially horizontal alignment, channel members connecting adjacent ends of successive said brackets to provide substantially rectangular frameworks, slots in the sides of said brackets for receiving the ends of said channel members, covers for said brackets, fastening means for said bracket covers including bolts extending across said slots within said brackets and providing abutments for said ends of said channel members, channel covers fastened over the open sides of said channel members to provide fully enclosed passageways for electrical wiring between successive said brackets, cross members supported within said frameworks and spaced to provide for carrying articles thereon, and slots in said channel members for receiving the opposite ends of said cross members.

3. A device of the character described including a plurality of hollow cantilever brackets each having mounting means at one end thereof and each enclosing electrical lighting equipment, said brackets being adapted for mounting in substantially horizontal alignment, channel members connecting adjacent ends of successive said brackets to provide substantially rectangular frameworks, slots in the sides of said brackets for receiving the ends of said channel members, covers for said brackets, fastening means for said bracket covers including bolts extending across said slots within said brackets and providing abutments for the ends of said channel members, channel covers fastened over the open sides of said channel members to provide fully enclosed passageways for electrical wiring between successive said brackets, a plurality of slots in the sides of said brackets at spaced intervals between said channel members, cross members supported within said frameworks and having their opposite ends extending into said spaced slots and terminating immediately within said brackets, and means engaging the ends of said cross members and preventing shifting thereof with respect to said brackets.

4. A device of the character described including a plurality of hollow cantilever brackets each having mounting means at one end thereof and each enclosing electrical lighting equipment, said brackets being adapted for mounting in substantially horizontal alignment, channel members connecting adjacent ends of successive said brackets to provide substantially rectangular frameworks, slots in the sides of said brackets for receiving the ends of said channel members, covers for said brackets, fastening means for said bracket covers including bolts extending across said slots within said brackets and providing abutments for said ends of said channel members, channel covers fastened over the open sides of said channel members to provide fully enclosed passageways for electrical wiring between successive said brackets, cross members supported within said frameworks for carrying articles thereon, partitions in said channel members dividing them into major and minor longitudinal passageways, slots in the sides of said channel members adjacent said minor passageways for receiving said ends of said cross members, and said ends of said cross members being in abutting relation with said partitions to prevent shifting of said cross members relative to said channel members.

5. A baggage rack adapted to be mounted above the seats in a vehicle and to house individual electrical lighting equipment for each seat comprising the combination of a plurality of hollow cantilever brackets each enclosing electrical lighting equipment for a seat, covers for said brackets, means for mounting said brackets in substantially horizontally aligned relation, channel members connecting the adjacent ends of successive said brackets to provide substantially rectangular frameworks, each said channel member having a longitudinal partition therein dividing the interior thereof into major and minor passageways, open top slots in the sides of said brackets receiving the opposite ends of said channel members, said channel members within said slots in place beneath said covers, cross members extending between parallel said channel members, open top slots in the sides of said channel members opening into the minor passageway therein for receiving the ends of said cross members in abutting relation to said partitions within the respective said channel members, and covers for said channel members clamping said cross members in place and providing enclosed conduits via said major passageways between successive said brackets to receive the wiring for the lighting equipment in said brackets.

6. A device of the character described including a plurality of hollow cantilever brackets each having mounting means at one end thereof, said brackets being adapted for mounting in substantially horizontal alignment, channel members connecting adjacent ends of successive said brackets to provide substantially rectangular frameworks, open top slots in the sides of said brackets for receiving the ends of said channel members, means for retaining the ends of said channel members in relatively fixed relation to said brackets to prevent shifting thereof with respect to said brackets, covers for said brackets arranged to extend over the open tops of said slots to clamp the ends of said channel members therein against vertical movement, cross members supported within said frameworks and spaced to provide for carrying articles thereon, open top slots in the sides of said channel members for receiving opposite ends of said cross members, and covers for said channel members fastened over the open sides of said channel members and across said slots therein to retain said cross members in position within said frameworks.

7. A device of the character described including a plurality of hollow brackets, means for mounting said brackets in substantially horizontal alignment, channel members connecting adjacent ends of successive said brackets to provide substantially rectangular frameworks, open top slots in the sides of said brackets for receiving the ends of said channel members, covers for said brackets arranged to extend over the open tops of said slots to clamp the ends of said channel members therein against vertical movement, cross members supported within said frameworks and spaced to provide for carrying articles thereon, open top slots in the sides of said channel members for receiving opposite ends of said cross members, and covers for said channel members fastened over the open sides of said channel members and across said slots therein to retain said cross members in position within said frameworks.

8. A device of the character described including a plurality of hollow brackets, means for mounting said brackets in substantially horizontal alignment, channel members connecting adjacent ends of successive said brackets to provide substantially rectangular frameworks, open top slots in the sides of said brackets for receiving the ends of said channel members, covers for said brackets arranged to extend over the open tops of said slots to clamp the ends of said channel members therein against vertical movement, cross members supported within said frameworks and spaced to provide for carrying articles thereon, further open top slots in the sides of said bracket members receiving the opposite ends of said cross members, and said bracket covers serving also to retain said cross members in position within said frameworks.

9. In a rack of the character described, a plurality of hollow cantilever brackets each enclosing electrical lighting equipment, means for mounting said brackets in spaced substantially horizontally aligned relation to each other, removable covers on said brackets providing access to said lighting equipment, a plurality of channel members connecting said brackets, said channel members each having a continuous opening along one side thereof extending the full length thereof, removable covers secured across the entire extent of said openings between said brackets defining enclosed passageways between said brackets for receiving electrical wiring for said equipment and providing access to said wiring between said brackets, bolts normally securing said covers on said channel members, and a longitudinal partition in those of said channel members receiving said wiring for separating said wiring from said bolts to prevent abrasive contact between said wiring and said bolts.

10. A device of the character described including a plurality of hollow brackets each having mounting means at one end thereof and each enclosing electrical lighting equipment, said brackets being adapted for mounting in substantially horizontal alignment, channel members connecting adjacent ends of successive said brackets to provide substantially rectangular frameworks, open top slots in the sides of said brackets for receiving the ends of said channel members, means for retaining the ends of said channel members in relatively fixed relation to said brackets to prevent shifting thereof with respect to said brackets, covers for said brackets extending over the open tops of said slots to retain the ends of said channel members therein against vertical movement, channel covers fastened over the open sides of said channel members to provide fully enclosed passageways for electrical wiring between successive said brackets, and cross members supported within said frameworks and spaced to provide for carrying articles thereon.

References Cited in the file of this patent

UNITED STATES PATENTS

| | | |
|---|---|---|
| 2,091,599 | Larson et al. | Aug. 31, 1937 |
| 2,250,954 | Hagerty et al. | July 29, 1941 |
| 2,251,050 | Hagerty et al. | July 29, 1941 |
| 2,461,446 | Schenmoes | Feb. 8, 1949 |